May 19, 1925

D. McD. SUSI 1,538,673

DIRECTION SIGNAL

Filed Feb. 2, 1925

Inventor:
Dominick McD. Susi,

May 19, 1925.
D. McD. SUSI
DIRECTION SIGNAL
Filed Feb. 2, 1925
1,538,673
2 Sheets-Sheet 2
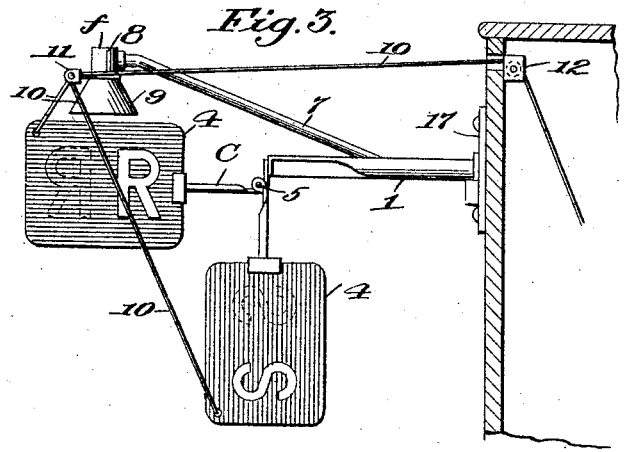
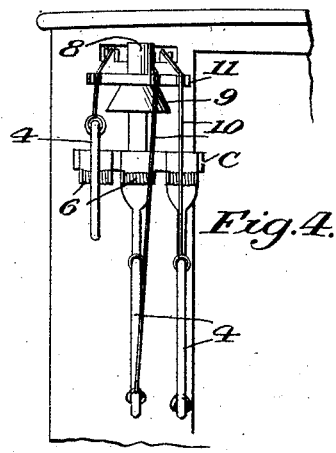
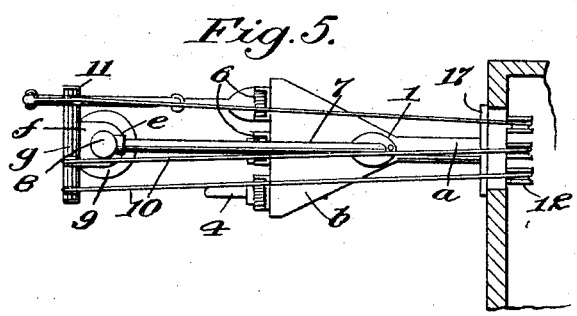
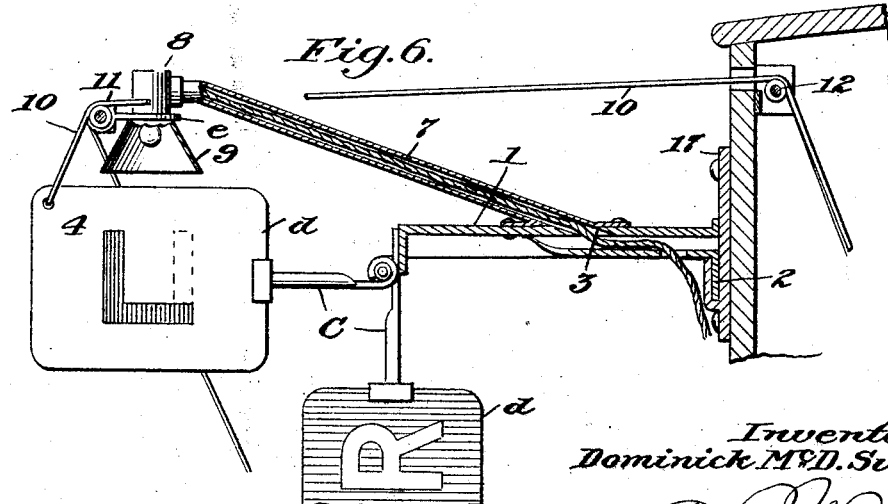
Inventor:
Dominick McD. Susi, Patented May 19, 1925.

1,538,673

UNITED STATES PATENT OFFICE.

DOMINICK McDONNELL SUSI, OF PITTSFIELD, MAINE.

DIRECTION SIGNAL.

Application filed February 2, 1925. Serial No. 6,364.

*To all whom it may concern:*

Be it known that I, DOMINICK McDONNELL SUSI, a subject of the King of Italy, residing at Pittsfield, in the county of Somerset and State of Maine, have invented a new and useful Direction Signal, of which the following is a specification.

This invention relates to direction indicators for vehicles of the character to be manually operated by the operator of the vehicle to indicate to those in front and behind the direction of travel proposed.

The object of the invention is the production of a device of the above stated character which is extremely simple in construction and which may be manufactured at a very low cost, while at the same time producing a durable and efficient device for the purpose intended.

The invention further resides in the sundry details of construction, combination and arrangement of parts which will be defined as the specification proceeds and pointed out in the appended claims.

In this specification and the annexed drawings, the invention is disclosed in the form in which it is considered to be the best, but the invention is not limited to such forms because it is capable of being embodied in other forms; and it is to be understood that in and by the claims following the description herein it is intended to cover the invention in whatever form it may embody within the scope thereof.

In the drawings which illustrate the preferred embodiment of the invention as at present devised:

Fig. 3 is a side elevation of the invention as applied to the Sedan type of automobile body;

Fig. 4 is an end elevation of the indicating device as shown in Fig. 3;

Fig. 5 is a plan view of the invention as shown in Fig. 3; and

Fig. 6 is an enlarged view similar to Fig. 3 with parts of the indicating device in section to illustrate its detailed construction.

In the following description and the annexed drawings like characters denote similar and like parts wherever indicated and referred to.

Figure 1:
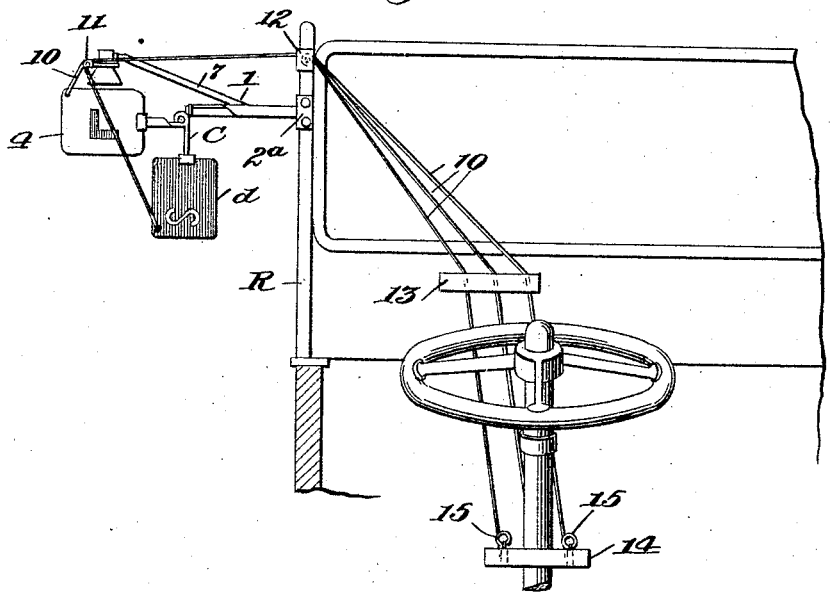
Figure 1 is a fragmentary rear elevation of a portion of the automobile in front of the driver's seat, and illustrating the invention applied thereto.

Referring particularly to the drawings, the indicator of the present invention comprises a bracket 1 which may be made of any suitable material. The bracket in the present showing is a metal plate having one end portion reduced as at $a$, the extremity of this portion being downwardly turned to form a lip 2 which engages in a suitable pocket or slot $y$ in a clamp $2^a$ suitably held and maintained on the windshield supporting rod R. The reduced portion $a$ of the bracket has the metal of its side edges rolled underneath the same to form a tubular conduit 3. At the larger end $b$ is preferably mounted a plurality of signal flags or paddles 4. In the present showing these flags consists of stems or rods $c$ hinged at one end to the portion $b$ of the bracket and carrying at their other end a suitable plate $d$ of substantially rigid material. These paddles or flags may consists of pieces of metal suitably colored and bearing suitable letters, marks or other characters which will indicate to the traffic or pedestrians the direction of travel which the vehicle is about to assume; or the flags may be constructed of translucent material suitably colored and provided on opposite faces with portions outlying said characters.

It will be observed that these paddles or flags 4 are arranged and constructed to normally lie in a depending position from the end of the bracket 1 and to be normally in alignment or nested, this normal position of the flags being maintained by the springs 6 mounted at the hinge connections 5. Mounted upon and carried by the bracket 1 is an extension 7, preferably of tubular construction, which projects forwardly from the bracket and has its extremity normally elevated above the plane which the signal flags or paddles will assume in their normal signaling position, as clearly illustrated in the drawings.

The outer end of this arm 7 has mounted thereon a suitable electric light bulb 8, in inverted position to receive a light bulb. The socket supports a reflecting shade 8 which is positioned for directing the rays of light downwardly upon the signaling flags when in signaling position.

The signaling flags or members 4 are raised from their normal depending position to a horizontal position by suitable flexible members 10 such as cables, chains, wires or the like, attached to one corner of each paddle and passed over a roller or sheave 11 mounted on the arm 7 and thence over a second sheave or roller 12 mounted on the windshield, from whence the cables extend to a plate or guide member 13, suitably mounted within the body of the vehicle, and preferably on the instrument board, and then to a key board 14 mounted on the steering column. The extremities of these flexible members carry enlarged loops or eyelets 15 which act as finger rings or handle pieces to be selectively operated or pulled when it is desired to present the proper signal device to the traffic. If it is desired to maintain the signal in signaling position for any given length of time the eyelet or finger piece 15 may be releasably engaged on a suitable hook or other suitable member 16 also mounted and clamped on the steering column. The guide members 13 and 14 are shown as being provided with apertures through which the cables 6 pass but these may be equipped with antifriction means if found desirable.

The sheave 11 preferably consists of a ring engaged about the socket 8 and held in place by the shade 9, the ring *e* carrying a projection *f* in which a roller *g* is mounted.

Figure 2:
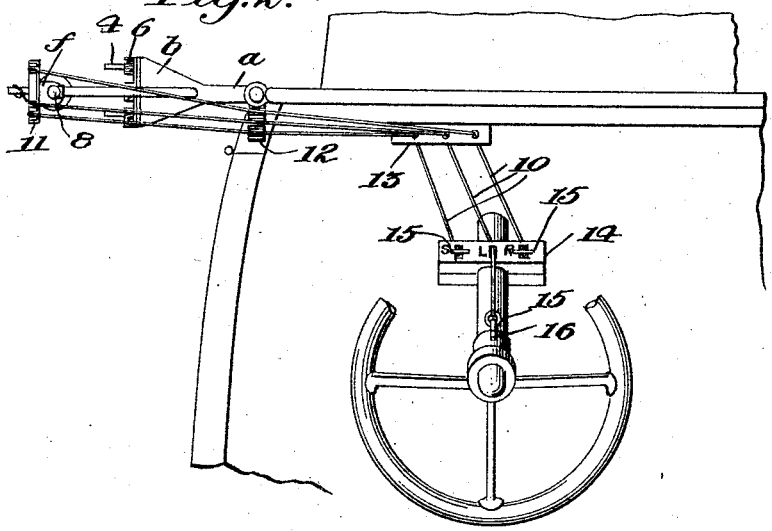
Fig. 2 is a top plan view of the invention as shown in Fig. 1.

The electrical conductors to the socket *a* are preferably inclosed within the tubular conduit 3 on the bracket and extend through the tubular arm 7. The device as shown in Figs. 3 to 6 inclusive is the same as in Figs. 1 and 2 except that a plate 17 is substituted for the clamp 2ª, the plate 17 being adapted to be more readily secured to the Sedan type of vehicle body.

In the operation of the device, it will be observed that when it is desired to give the stop indication the finger piece 15 is grasped and pulled to elevate the paddle or flag 4 bearing the character S. When it is desired to operate the other signals to give the right and left indications, the corresponding finger piece 15 is selected on the key-board 14 and operated in a similar manner.

In the present showing the paddles are shown as of translucent material suitably colored with the characters on opposite sides so that the rays from the electric light will be reflected and penetrate the various signals at night. It is to be understood, however, that non-transparent material may be used in which case it is only necessary to enlarge the reflector 9 for the purpose of illuminating the paddles.

It is also within the purview of the invention to have the cables 10 pass through the tubular arm 7 in the conduit 3.

From the above description it will be seen that a very efficient and economical type of vehicle indicator is produced, and one with few or no parts to get out of order or to be replaced.

Having thus described the invention what I claim as new is:

1. A direction indicator comprising a bracket to be attached to a suitable portion of a vehicle, a plurality of signal arms pivotally mounted on the bracket and normally held in alined inoperative position with respect to the bracket, a substantially rigid extension projecting from said bracket and a light mounted on the free end of said extension to lie adjacent said signal arms when moved to operative signaling position, and means for operating said signaling arms comprising flexible elements connected to each of said signal arms, respectively, and extended over guide means on the free end of said substantially rigid extension of the bracket to terminate within the vehicle adjacent the driver's seat, whereby said flexible members may be selectively operated to give the desired signal.

2. A direction indicator as set forth in claim 1 further characterized by said signal arms comprising translucent members of different colors, character indications on each side of said translucent members, whereby when the light penetrates said members the characters will read correctly when viewed from either side of the respective signal arms.

3. A direction indicator for vehicles comprising a bracket having one end provided with means for attachment to a vehicle body and having a portion thereof bent to form a conduit adjacent said attaching end thereof, signal arms hingedly mounted at the opposite end thereof, means for normally maintaining said signal arm in alined vertical non-signaling position, a tubular extension projecting from said bracket to a point beyond said opposite end thereof, an electric light mounted on the free end of said tubular extension to direct its rays upon said signal arms when in signaling position, and means for moving said signal arms from their normal non-signaling position to a substantially horizontal position adjacent said light consisting of flexible members connected to said signaling arms, respectively, and extended over guide means on the end of said tubular extension to a point within the vehicle to be selectively engaged and operated by the operator thereof, the conduit in the bracket communicating with the conduit provided by said tubular extension whereby conductors and flexible members may extend through the device and be concealed from view.

In testimony whereof I have hereunto set my hand.

DOMINICK McDONNELL SUSI.